United States Patent
Wang et al.

(10) Patent No.: US 12,302,249 B2
(45) Date of Patent: May 13, 2025

(54) WIRELESS ENERGY TRANSFER AND FEEDBACK

(71) Applicant: QUALCOMM Incorporated, San Diego, CA (US)

(72) Inventors: Xiaojie Wang, Hillsborough, NJ (US); Junyi Li, Fairless Hills, PA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 17/812,357

(22) Filed: Jul. 13, 2022

(65) Prior Publication Data

US 2024/0023020 A1   Jan. 18, 2024

(51) Int. Cl.
*H04W 52/02* (2009.01)
*H02J 50/00* (2016.01)
*H04L 5/00* (2006.01)

(52) U.S. Cl.
CPC ....... *H04W 52/0229* (2013.01); *H02J 50/001* (2020.01); *H04L 5/0012* (2013.01)

(58) Field of Classification Search
CPC ... H04W 52/0229; H02J 50/001; H02J 50/20; H04L 5/0012; H04B 17/24
See application file for complete search history.

(56) References Cited

U.S. PATENT DOCUMENTS

| 2019/0089207 A1* | 3/2019 | Kim | H04W 4/70 |
| 2022/0271567 A1* | 8/2022 | Johnston | H02J 50/20 |
| 2023/0014594 A1* | 1/2023 | Lee | H02J 50/20 |

FOREIGN PATENT DOCUMENTS

| EP | 4117144 A1 | 1/2023 |
| KR | 102348248 B1 | 1/2022 |
| WO | 2019067956 A1 | 4/2019 |

OTHER PUBLICATIONS

International Search Report and Written Opinion—PCT/US2023/070038—ISA/EPO—Dec. 11, 2023.
Partial International Search Report—PCT/US2023/070038—ISA/EPO—Oct. 20, 2023.

* cited by examiner

*Primary Examiner* — Farid Seyedvosoghi
(74) *Attorney, Agent, or Firm* — Patterson + Sheridan, L.L.P.

(57) ABSTRACT

Certain aspects of the present disclosure provide a method for wireless communication by a transmitter generally including transmitting a first energy signal to a receiver and receiving, from the receiver, feedback regarding an energy state of the first energy signal as received at the receiver.

28 Claims, 15 Drawing Sheets

WIRELESS ENERGY TRANSFER AND FEEDBACK

BACKGROUND

Field of the Disclosure

Aspects of the present disclosure relate to wireless communications, and more particularly, to mechanisms for providing feedback for energy transfer to wireless devices.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a transmitter. The method includes transmitting a first energy signal to a receiver; and receiving, from the receiver, feedback regarding an energy state of the first energy signal as received at the receiver.

Another aspect provides a method for wireless communication by a receiver. The method includes receiving a first energy signal from a transmitter; and transmitting, to the transmitter, feedback regarding an energy state of the first energy signal as received at the receiver.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable media for providing feedback for energy transfer to wireless devices, such as radio frequency identification (RFID) tags.

A new generation of wireless devices may overcome conventional limitations of on-board energy storage by harvesting energy from wireless signals (e.g., radio frequency (RF) signals) to perform wireless communications. Such energy harvesting devices (e.g., user equipments) may include, for example, RFID devices (e.g., RFID tags), that are capable of receiving signals and "backscattering" them to another device to perform wireless communications. These aforementioned devices may generally be passive, in which case they include no on-board energy storage and rely entirely on harvested energy from received signals to perform wireless communications (e.g., via backscattering signals). Thus, energy-harvesting devices may be considered a type of user equipment (UE) that provides low-cost and low-power solutions for many applications in a wireless communications system.

One potential limitation in deploying RFID devices is that they typically support only short-range communication. For example, a reader may need to be separated by less than 10 meters from a passive Internet of Things (IoT) RFID device for an interrogating signal to be sufficiently strong due to insufficient link budget issues. Thus, the power link, or downlink between a reader and RFID tag may prove to be the bottleneck link. This is because power-harvesting circuitry typically needs relatively high input power to ensure satisfactory cost and conversion efficiency to power the RFID device. Attempts by a reader to interrogate an RFID device with insufficient input power result in wasted power and wasted signaling overhead.

Aspects of the present disclosure, however, provide feedback mechanisms where an RFID tag may provide information regarding a received signal. The feedback may, in effect, provide channel state information (CSI) to the reader, which may take action to help improve the link budget. For example, a reader may be able to increase transmit power or perform beamforming to improve the link budget. As a result, the feedback mechanisms proposed herein may help ensure sufficient input power at an RFID device and avoid wasted power and signaling overhead.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
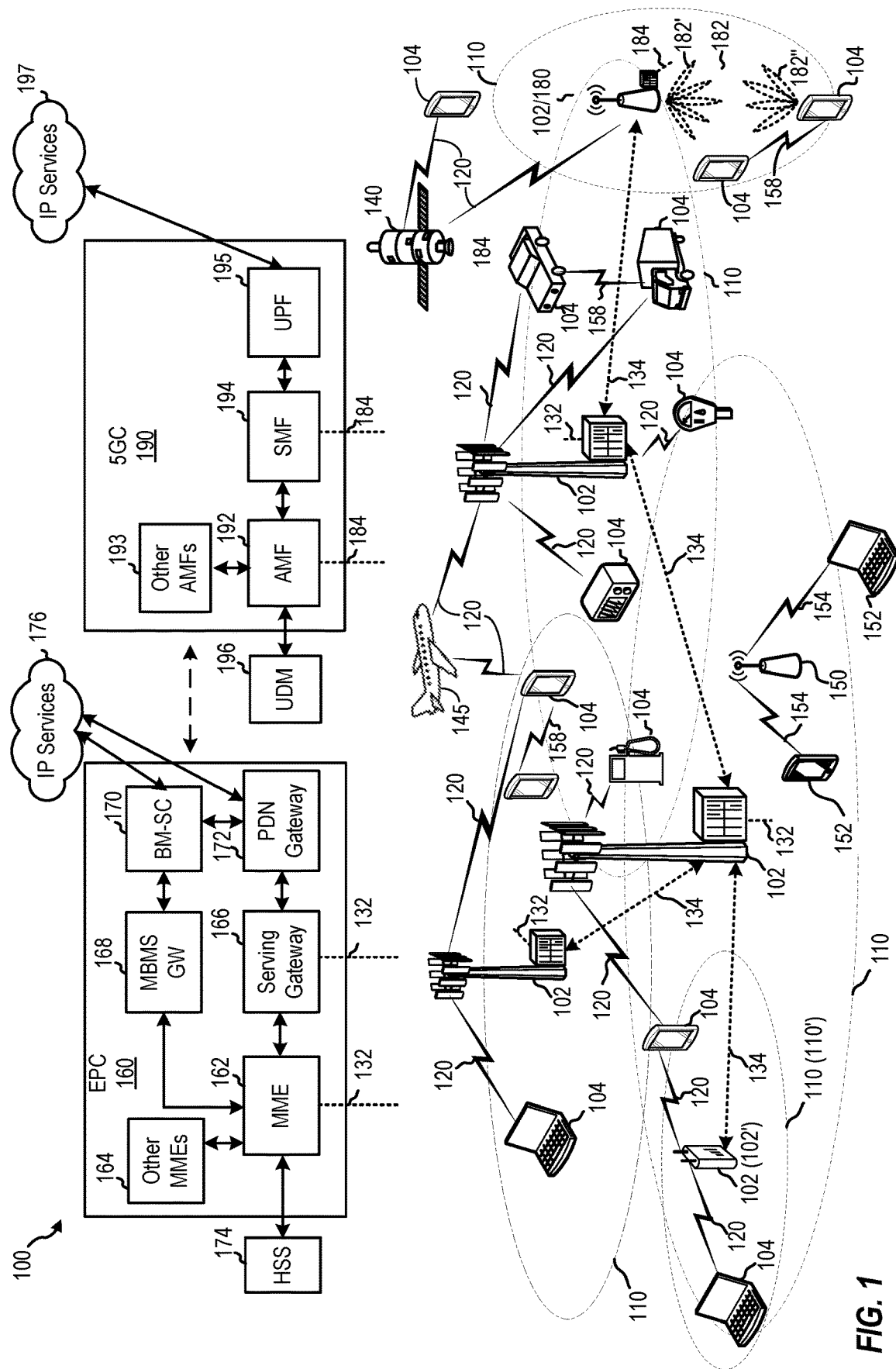
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
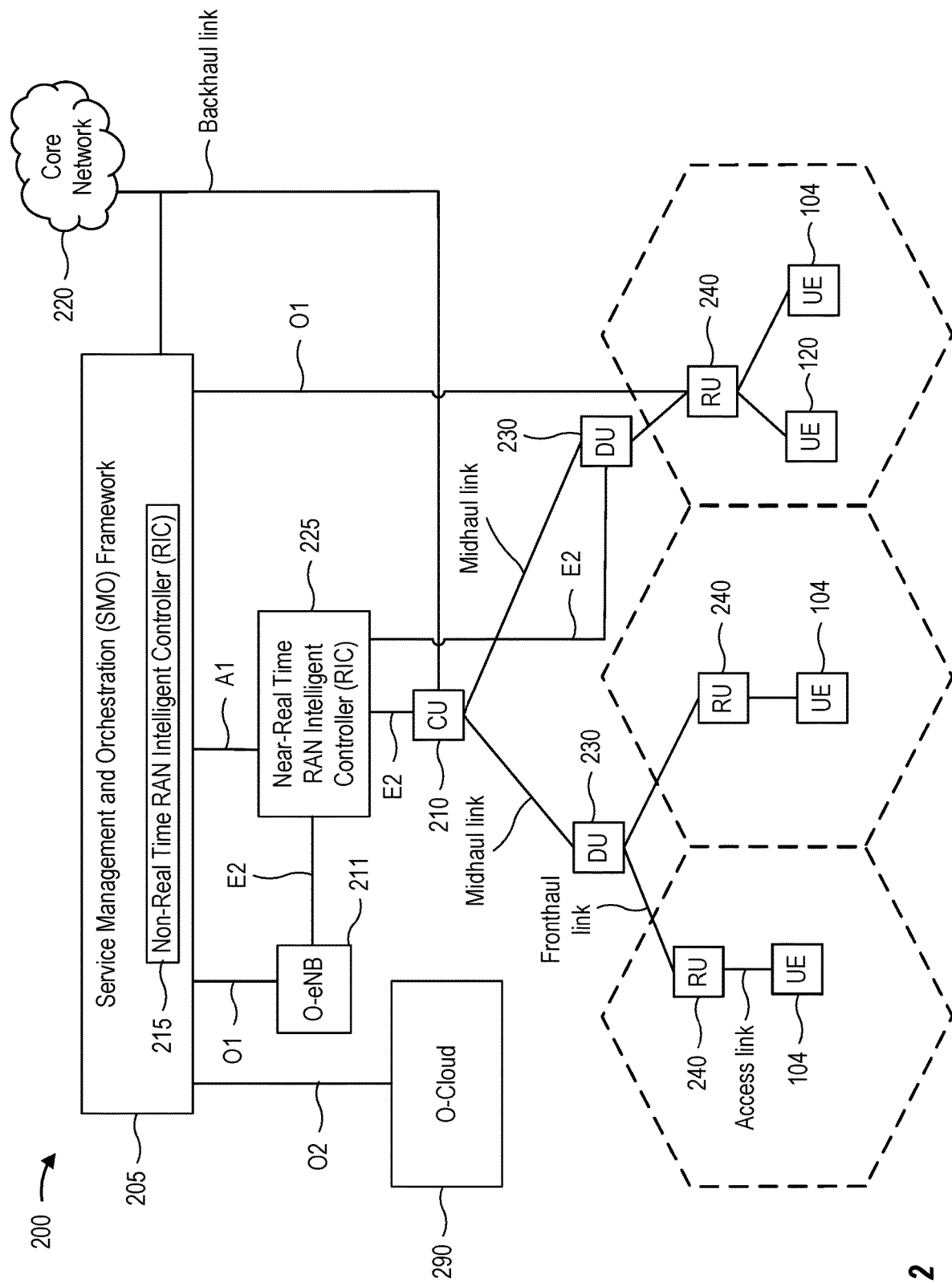
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
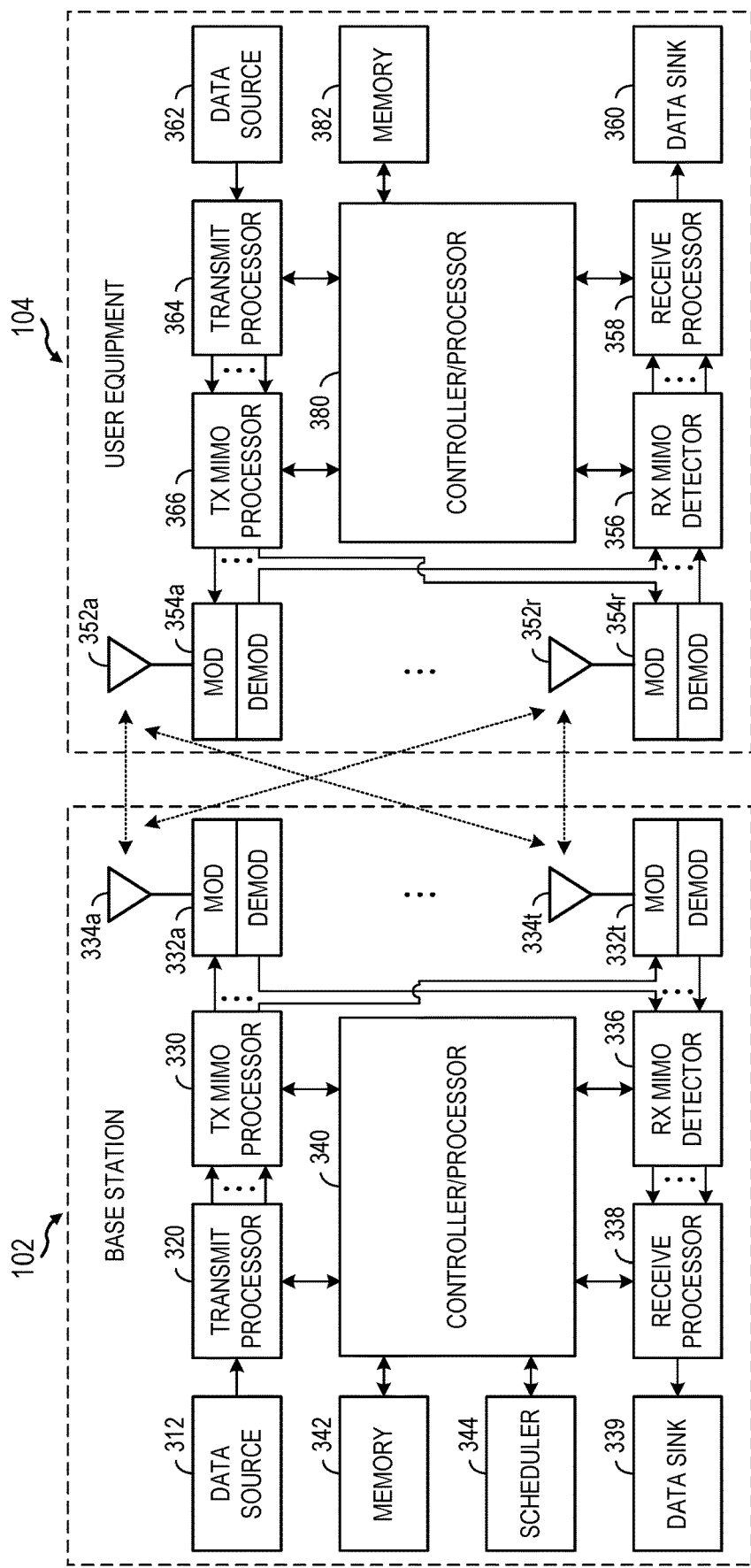
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
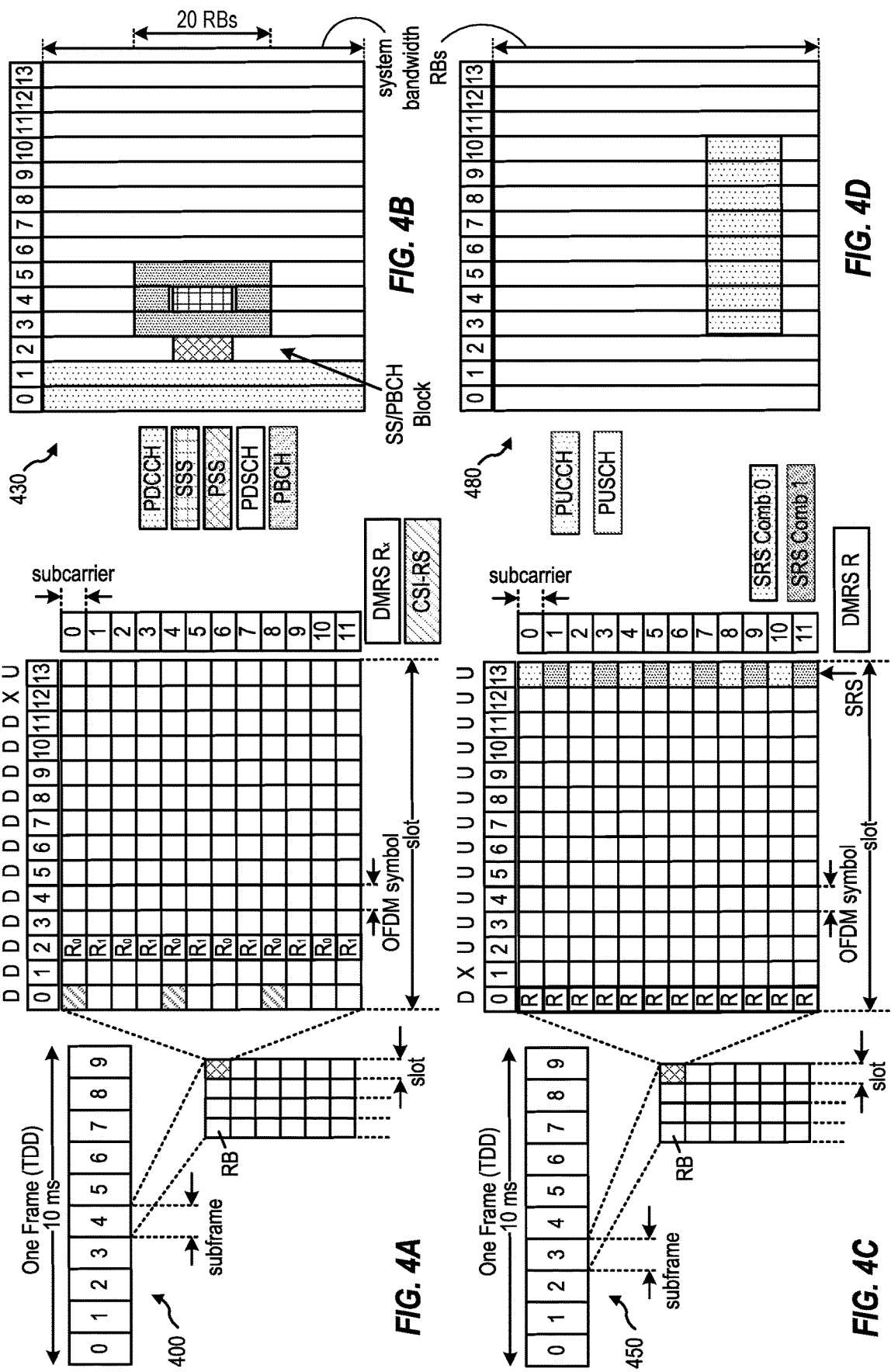
FIGS. 4A, 4B, 4C, and 4D depict various example aspects of data structures for a wireless communications network.

In particular, FIG. 4A is a diagram 400 illustrating an example of a first subframe within a 5G (e.g., 5G NNR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2μ slots/subframe. The subcarrier spacing and symbol length/duration are a function of the numerology. The subcarrier spacing may be equal to $2^{\mu} \times 15$ kHz, where is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to Energy Harvesting in RFID Systems

Radio frequency identification (RFID) is a rapidly growing technology impacting many industries due to its economic potential for inventory/asset management within warehouses, internet of things (IoT), sustainable sensor networks in factories and/or agriculture, and smart homes, to name a few example applications. RFID technology consists of RFID devices (or backscatter devices), such as transponders, or tags, that emit an information-bearing signal upon receiving an energizing signal.

In certain aspects, RFID devices may be operated without a battery. Generally, RFID devices that are operated without a battery are known as passive RFID devices. Passive RFID devices may operate by harvesting energy from received radio frequency signals (e.g., "over the air"), thereby powering reception and transmission circuitry within the RFID devices. This harvested energy allows passive RFID devices to transmit information, sometimes referred to as backscatter modulated information, without the need for a local power source within the RFID device. On the other hand, in certain aspects, RFID device may be semi-passive and include on-board energy storage to supplement their ability to harvest energy from received signals (however, at higher cost).

In certain aspects, in addition to harvesting power from RF sources, energy harvesting devices may accumulate energy from other direct energy sources, such as solar energy, in order to supplement its power demands. Semi-passive energy harvesting devices may, in some cases, include power consuming RF components, such as analog to digital converters (ADCs), mixers, and oscillators.

Thus, RFID devices are a type of user equipment that provides low-cost and low-power solutions for many applications in a wireless communications system. Such devices may be very power efficient, sometimes requiring less than 0.1 mW of power to operate. Further, their relatively simple architectures and, in some cases, lack of battery, mean that such devices can be small, lightweight, and easily installed or integrated in many types of environments or host devices. Generally speaking then, RFID devices provide practical and necessary solutions to many networking applications that require, low-cost, small footprint, durable, maintenance-free, and long lifespan communications devices. For example, RFID devices may be configured as long endurance industrial sensors, which mitigates the problems of replacing batteries in and around dangerous machinery.

Figure 5:
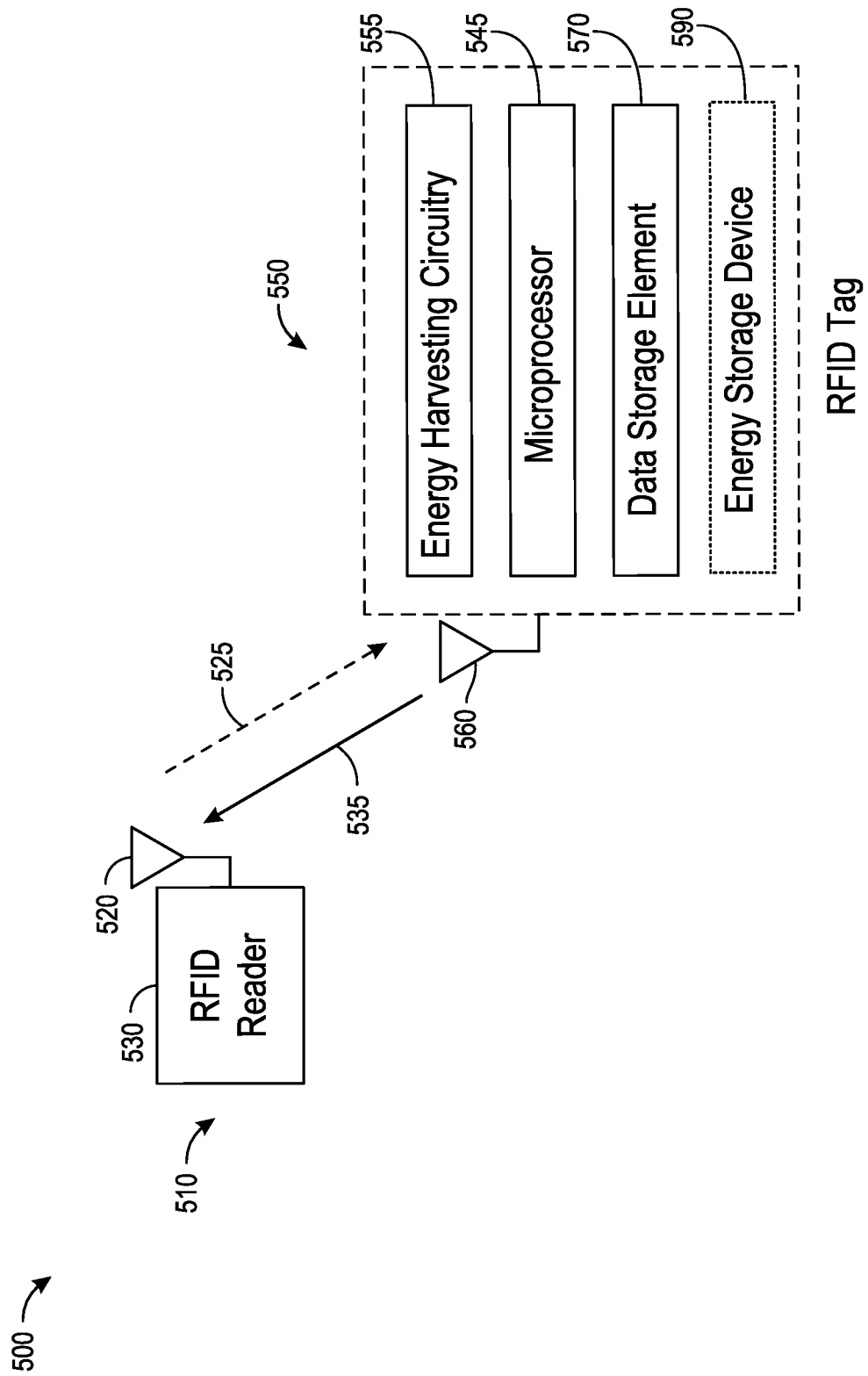
FIG. 5 illustrates a radio frequency identification (RFID) system.

FIG. 5 shows an RFID system 500. As shown, RFID system 500 includes a reader 510 and an RFID tag 550. Reader 510 may also be referred to as an interrogator or a scanner. RFID tag 550 may also be referred to as an interrogator, RFID label, or an electronics label. In certain aspects, reader 510 is a network entity (e.g., such as a gNB) and RFID tag 550 is a user equipment (UE).

Reader 510 includes an antenna 520 and an electronics unit 530. Antenna 520 radiates signals transmitted by reader 510 and receives signals from RFID tags and/or other devices. Electronics unit 530 may include a transmitter and a receiver for reading RFID tags such as RFID tag 550. The same pair of transmitter and receiver (or another pair of transmitter and receiver) may support bi-directional communication with wireless networks, wireless devices, etc. Electronics unit 530 may include processing circuitry (e.g., a processor) to perform processing for data being transmitted and received by the RFID reader 510.

As shown, RFID tag 550 includes an antenna 560 and a data storage element 570. Antenna 560 radiates signals transmitted by RFID tag 550 and receives signals from RFID reader 510 and/or other devices. Data storage element 570 stores information for RFID tag 550, for example, in an electrically erasable programmable read-only memory (EEPROM) or another type of memory. RFID tag 550 may also include an electronics unit that can process the received signal and generate the signals to be transmitted.

In certain aspects, RFID tag 550 may be a passive RFID tag having no battery. In this case, induction may be used to power the RFID tag 550. For example, in some cases, a magnetic field from a signal transmitted by reader 510 may induce an electrical current in RFID tag 550, which may then operate based on the induced current. RFID tag 550 can radiate its signal in response to receiving a signal from RFID reader 510 or some other device. In certain other aspects, RFID tag 550 may optionally include an energy storage device 590, such as a battery, capacitor, etc., for storing energy harvested using energy harvesting circuitry 555, as described below.

In one example, RFID tag 550 may be read by placing the reader 510 within close proximity to RFID tag 550. Reader 510 may radiate a first signal 525 via the antenna 520. In some cases, the first signal 525 may be known as an interrogation signal or energy signal. In some cases, energy of the first signal 525 may be coupled from reader antenna 520 to RFID tag antenna 560 via magnetic coupling and/or other phenomena. In other words, the RFID tag 550 may receive the first signal 525 from reader 510 via antenna 560 and energy of the first signal 525 may be harvested using energy harvesting circuitry 555 (e.g., an RF transducer) and used to power RFID tag 550. For example, energy of the first signal 525 received by RFID tag 550 may be used to power a microprocessor 545 of RFID tag 550. Microprocessor 545 may, in turn, retrieve information stored in a data storage element 570 of RFID tag 550 and transmit the retrieved information via a second signal 535 using the antenna 560. For example, in some cases, microprocessor 545 may generate the second signal 535 by modulating a baseband signal (e.g., generated using energy of the first signal 525) with the information retrieved from the data storage element 570. In some cases, this second signal 535 may be known as a backscatter modulated information signal. Thereafter, as noted, microprocessor 545 transmits the second signal 535 to reader 510. Reader 510 may receive the second signal 535 from RFID tag 550 via antenna 520 and may process (e.g., demodulate) the received signal to obtain the information of data storage element 570 sent in second signal 535.

In some cases, RFID system 500 may be designed to operate at 13.56 MHz or some other frequency (e.g., an ultra-high frequency (UHF) band at 900 MHz). Reader 510 may have a specified maximum transmit power level, which may be imposed by the Federal Communication Commission (FCC) in the United Stated or other regulatory bodies in other countries. The specified maximum transmit power level of reader 510 may limit the distance at which RFID tag 550 can be read by reader 510.

Wireless technology is increasingly useful in industrial applications, such as ultra-reliable low-latency communication (URLLC) and machine type communication (MTC). In such domains, and others, it is desirable to support devices (e.g., passive RFID tags) that are capable of harvesting energy from wireless energy sources (e.g., in lieu of or in combination with a battery or other energy storage device, such as a capacitor), such as RF signals, thermal energy, solar energy, and the like.

Aspects Related to Wireless Energy Transfer and Feedback

Aspects of the present disclosure provide apparatuses, methods, processing systems, and computer-readable mediums for providing feedback for energy transfer to wireless devices, such as radio frequency identification (RFID) tag.

As noted above, one potential limitation in deploying RFID devices is that they typically support only short-range communication. For example, a reader may need to be separated by less than 10 meters from a passive Internet of Things (IoT) RFID device for an interrogating signal to be sufficiently strong for RF power harvesting (PH) circuitry on an RFID device. Such circuitry may have non-linear input power needs (e.g., due to diodes) and may need input power to be above a threshold to operate.

Figure 6:
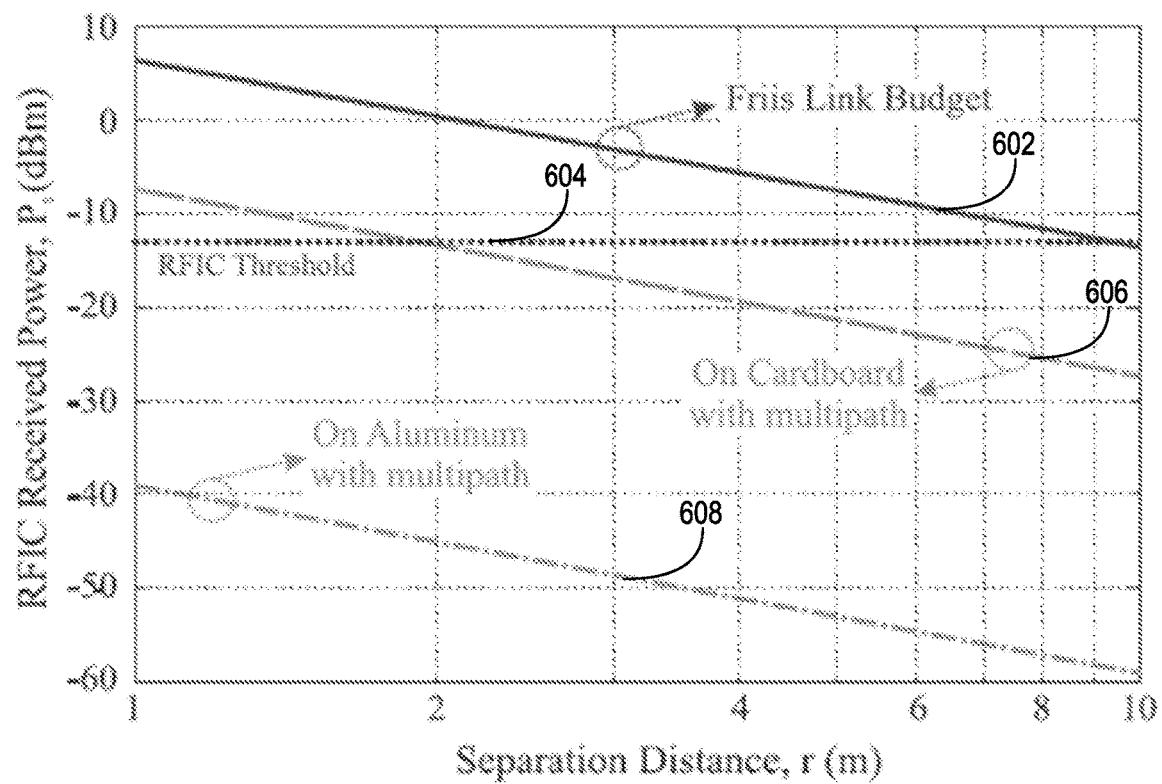
FIG. 6 depicts the relationship between separation distance and received power for RFID devices.

For example, as illustrated in FIG. 6, input power may need to be above an RF integrated circuit (RFIC) threshold 604 (e.g., of approximately −13 dBm) to trigger (turn-on) the PH circuitry (due to turn-on voltage of diodes). As illustrated by the curve 602, even at idealized conditions (referred to as Friis link budget), the separation between reader and RFID may still need to be less than 10 meters to meet this threshold. Friis link budget generally corresponds to the power received by one antenna under idealized conditions given another antenna some distance away transmitting a known amount of power).

Further, PH circuitry may have a frequency-selective conversion efficiency (e.g., being more efficient at lower frequencies due to diode junction capacitance and resistance). As also illustrated in FIG. 6, reflections by multi-path effects can also cause fading to the energy signal and degrade the range. For example, multipath effects on cardboard (606) may reduce the allowable separation distance to 2 meters to ensure the RFIC threshold is met, while multipath effects on more reflective medium (e.g., aluminum per 608) may make it virtually impossible to meet the RFIC threshold.

Aspects of the present disclosure, however, may provide feedback mechanisms where an RFID tag can provide information regarding a received signal. The feedback may, in effect, provide channel state information (CSI) to the reader, which may take action to help improve the link budget. For example, a reader may be able to increase transmit power or perform beamforming to improve the link budget and mitigate fading. As a result, the feedback mechanisms proposed herein may help ensure sufficient input power at an RFID device and avoid wasted power and signaling overhead.

Figure 7:
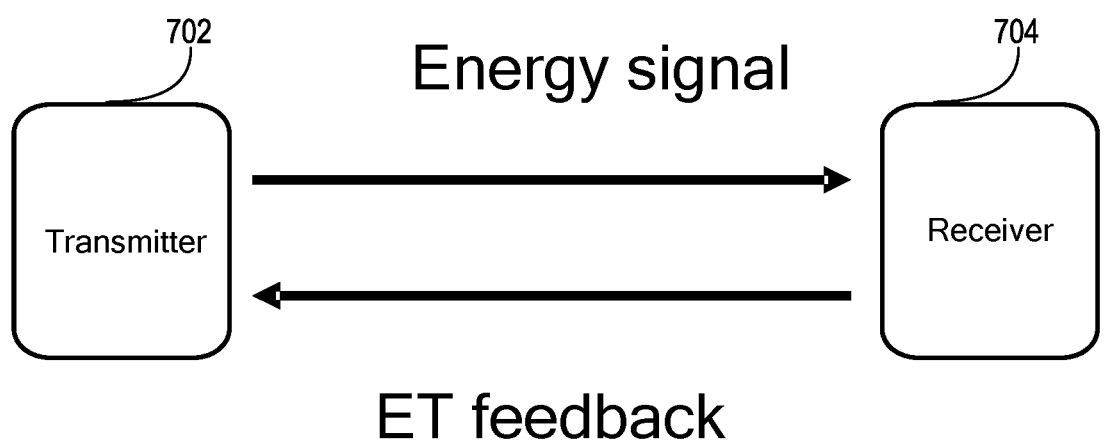
FIG. 7 depicts example feedback from an energy receiver to an energy transmitter, in accordance with aspects of the present disclosure.

FIG. 7 provides an overview of the energy transfer (ET) feedback mechanism proposed herein. As illustrated, a transmitter 702 (e.g., a reader, such as a UE or gNB) may send an energy signal to a receiver 704 (e.g. a UE, such as a passive RFID tag). Receiver 704 may send a signal with ET feedback.

Figure 8:
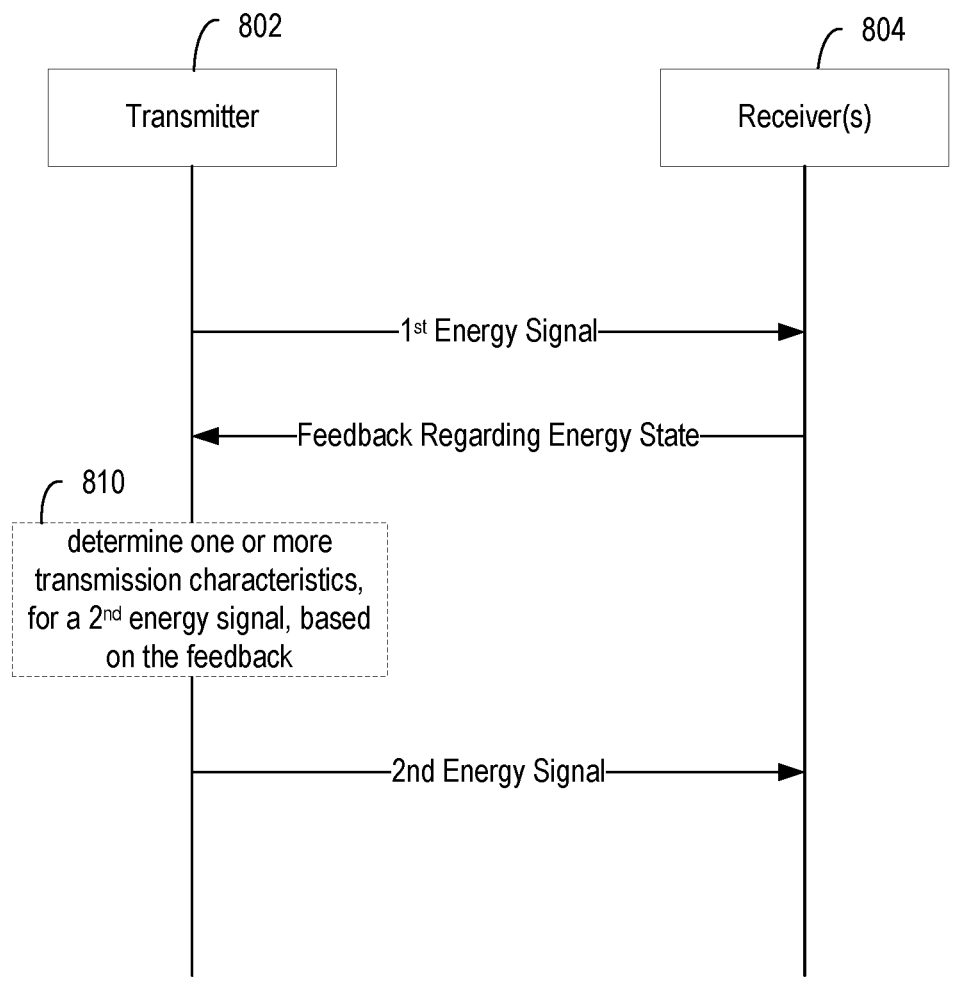
FIG. 8 is a call flow diagram illustrating example signaling between an energy transmitter and an energy receiver, in accordance with aspects of the present disclosure.

The call flow diagram 800 of FIG. 8 shows how ET feedback from one or more receivers 802 may be used by a transmitter 804 for a subsequent transmission. In certain aspects, transmitter 802 is a reader, such as RFID reader 510 illustrated in FIG. 5, and receiver 804 is a passive RFID tag, such as RFID tag 550 (where RFID tag 550 is a passive RFID device) illustrated in FIG. 5. However, in other aspects, transmitter 802 may be another type of wireless communications device (e.g., network entity, network node, etc.), and, similarly, receivers 804 may be another type of wireless communications device (e.g., UE, etc.), such as those described herein.

As illustrated, transmitter 802 may send a first energy signal to receiver 804. Energy signals may be sent using different waveforms and, in some cases, may be beamformed/pre-coded toward certain directions.

In some cases, energy signals may contain information about intended ERs that may respond (with feedback). While the transmitter may allow any receiver to respond, in some cases, the transmitter may only allow those that have receiver IDs indicated in the energy signal. As will be described in greater detail below, the energy signal may also include other information, such as an energy threshold that a receiver may use to determine when to respond with feedback.

As illustrated, receiver 804 receiving the energy signal may provide energy state feedback to the transmitter 804. For example, receiver 804 may decode information in energy the signal, such as an energy threshold and receiver ID to determine if it should provide feedback. For example, a receiver that receives the energy signal below the threshold may provide feedback to request for charging. In some cases, more than one receiver may respond with feedback.

As illustrated at 810, transmitter 802 may receive the feedback and determine one or more transmission characteristics for a second energy signal, based on the feedback. For example, transmitter 802 may attempt to optimize its energy waveform and/or beamforming direction of the second energy signal transmission to receiver 804.

Figure 9A:
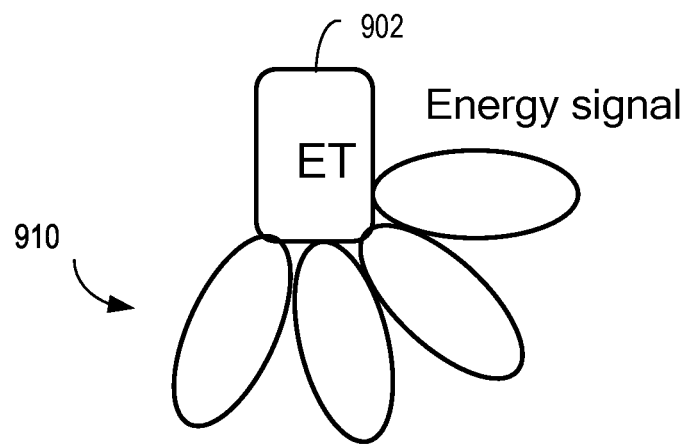
FIG. 9A and FIG. 9B depict example variations of energy signal transmissions, in accordance with aspects of the present disclosure.

As illustrated in FIG. 9A, the transmitter may transmit beamformed energy signals in selected directions from the transmitter position. Similarly, the receiver's feedback may be received from different beam directions. This may allow the transmitter to decide what direction to send a subsequent energy signal. For example, if the transmitter receives a feedback signal on multiple received beam directions, it may determine which beam direction had a strongest received signal and transmit a subsequent energy signal in a corresponding direction (e.g., assuming reciprocity). Similarly, the transmitter may adjust transmit power of a subsequent energy signal based on received signal strength of feedback.

As noted above, energy signals may contain information about receiver IDs, indicating which receivers are allowed (or requested) to provide energy state feedback. In some cases, energy signals could also indicate an energy-threshold below which (or above which) level the receiver can respond. For example, the threshold level may indicate that the receiver is to respond with feedback if its energy storage falls below 50% of its capacity. Instead of a percentage, an absolute threshold may be specified (e.g., in terms of X mJ).

Figure 9B:
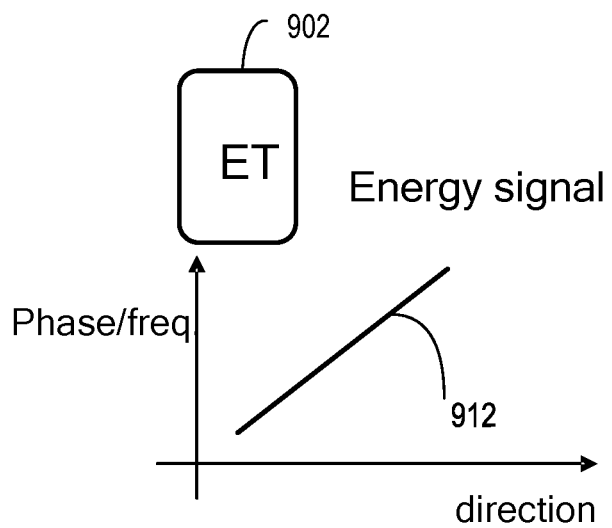

As illustrated in FIG. 9B, in some cases, the transmitter may sweep the carrier phase or frequency of the energy signal. Sweeping a carrier phase may be done, for example, in the context of positioning (e.g., per a VHF omni-directional range or VOR signal). In such cases, a carrier signal may broadcast to all directions with different phases by effectively rotating a transmit antenna (e.g., mechanically or electrically). In such cases, the ER feedback may be received with different phases.

Frequency sweeping may be performed in the context of object detection (e.g., Frequency-Modulated Continuous Wave FMCW radar-based). In such cases, a carrier signal may be broadcast to all directions with different frequencies and the receiver feedback may be received with different frequencies.

In some cases, energy signals may include information using some form of modulation, such as On Off Keying (OOK), frequency shift keying (FSK), or phase shift keying (PSK).

ER may decode the energy signal for feedback configuration information. For example, the configuration information may include one or more receiver IDs, energy thresholds, or a type of feedback scheme. For example, the feedback scheme may be time division multiplexed (TDM) where different receivers transmit feedback at different times, frequency division multiplexed (FDM) where different receivers transmit feedback on different frequencies, or as a single frequency network (SFN) where different receivers transmit (e.g., the same feedback) using the same frequency resources (and the feedback signals are effectively combined over the air).

As noted above, an energy threshold may indicated as a percentage of a receiver's storage or a quantity of minimum required energy in Joules. In some cases, a transmitter may select an energy threshold based on its intended subsequent communication and estimated energy requirement for that communication. In other words, a longer communication may require more energy and the threshold may be set accordingly so the transmitter can be sure the receiver has sufficient energy. As will be described in greater detail below, in some cases, a transmitter may configure more than one energy threshold for feedback.

If a receiver satisfies the feedback conditions, the receiver will transmit feedback to indicate its energy state. The transmitter may adjust accordingly. For example, based on the feedback, the transmitter may transmit an energy signal longer toward a specific UE or direction.

Figure 10A:
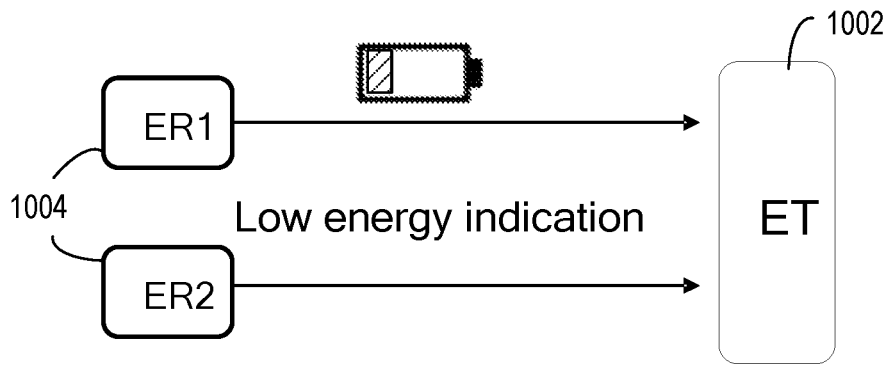
FIG. 10A, FIG. 10B, and FIG. 10C depict example variations of feedback for energy signal transmissions, in accordance with aspects of the present disclosure.

For example, as illustrated in FIG. 10A, feedback from a receiver 1004 may indicate low energy and that the receiver may require a longer charging time. Based on this feedback, a transmitter 1002 may transmit a subsequent energy signal for a longer duration (e.g., which may be determined based on the energy threshold) to allow for charging. In this example, receivers (e.g., ER1 and ER2) requiring longer charging may transmit feedback, while other UEs (receivers) with energy above the threshold will not transmit.

Figure 10B:
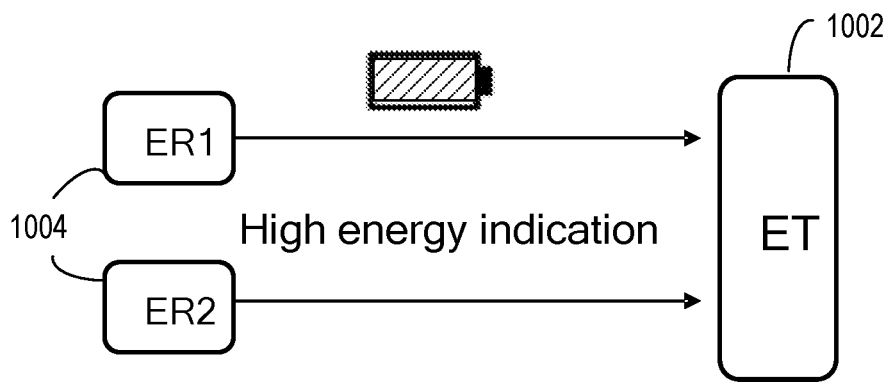

As an alternative, as illustrated in FIG. 10B, feedback from a receiver 1004 may indicate (sufficiently) high energy and that the receiver may not require charging. In this case, UEs with energy state above the energy threshold may transmit feedback. A transmitter may transmit energy signals to charge other UEs that do not report feedback. This approach may allow low power receivers to perform power harvesting without spending energy on transmitting feedback.

Figure 10C:
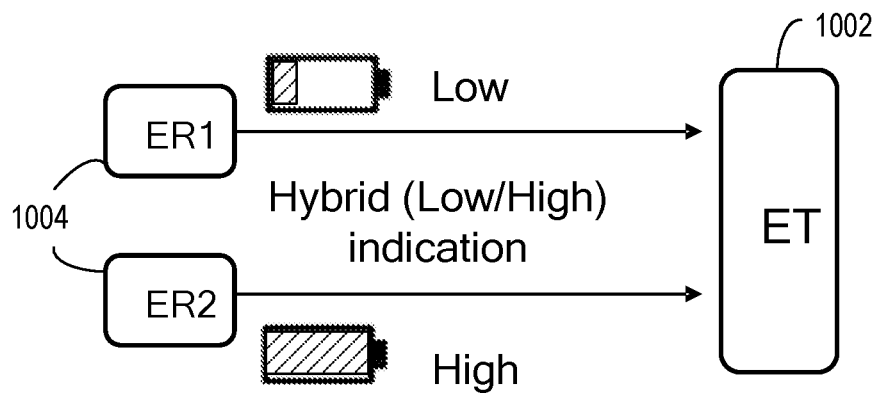

As illustrated in FIG. 10C, a hybrid approach may allow receivers to transmit indications of high or low energy. For example, a receiver may be configured to transmit a first type of feedback if it below a first energy threshold (as does ER1 in the illustrated example) or a second type of feedback if it above a second energy threshold (as does ER2 in the illustrated example). The first and second types of feedback may be distinguished, for example, via waveform type, FDM, TDM, or modulation type. In this case, the second energy threshold is higher than the first threshold and the actual values may be determined based on various considerations. For example, mission critical receivers (e.g., IoT RFIDs in a factory floor) may not be allowed to reach too low a storage level.

ET may select dynamically select whether to configure one or more receivers to transmit feedback to indicate low energy (per FIG. 10A), high energy (per FIG. 10B), or both (per FIG. 10C). The decision on which to select may depend, for example, on operating conditions or the type of receivers and their intended use.

Feedback may be transmitted using different waveforms, such as backscattering (as in RFID for low-power consumption) or other some other type of transmission, such as Bluetooth Low Energy (BLE).

Figure 11:
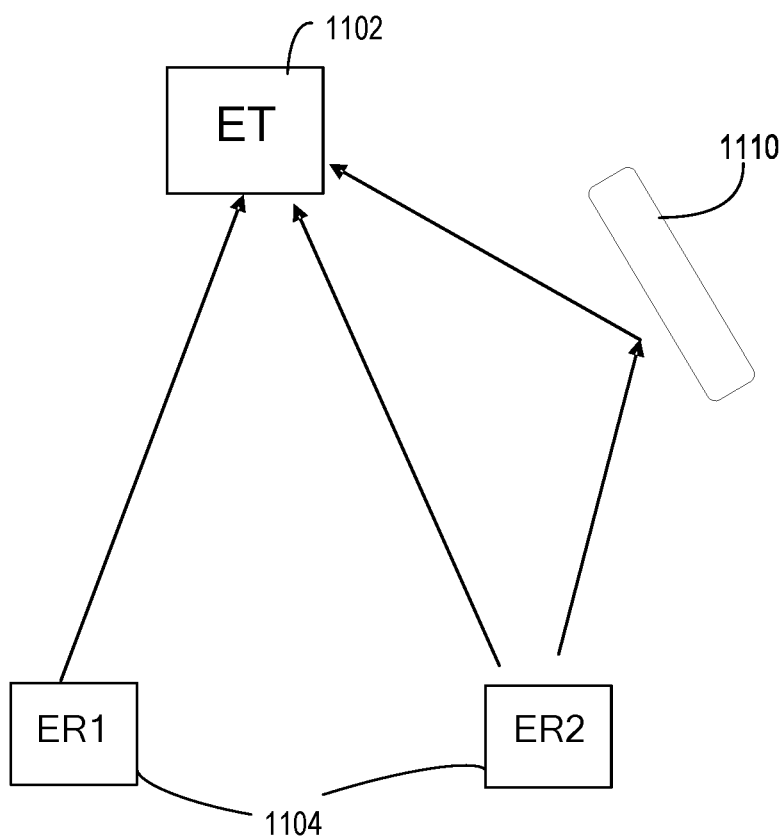
FIG. 11 depicts an example of different paths of feedback for energy signal transmissions, in accordance with aspects of the present disclosure

As noted above and as illustrated in FIG. 11, in some cases, multiple receivers may transmit feedback simultaneously. If an SFN scheme is used, all receivers transmitting feedback may use the same time and frequency resource. In such cases, feedback signals may add up over the air (constructively or destructively).

In some cases, receivers may transmit the feedback using frequency hopping. In such cases, each receiver may select frequency resources at any given time based on a frequency hopping pattern), which may help avoid multi-path reflection (destructively adding up). In such cases, different receivers may apply different hopping patterns, which may help avoid receiver feedback signals adding up destructively.

In case a TDM scheme is used, each receiver may be provided an indication of time resources to use for their feedback signal. In case an FDM scheme is used, each receiver may be provided an indication of frequency resources to use for their feedback signal. In case a code division multiplexing (CDM) scheme is used, each receiver may be assigned an indication of code resources to use for their feedback signal. With these various options, frequency hopping could still be applied in an effort to avoid signals destructively adding up, due to multi-path effects.

Example Operations of a Transmitter

Figure 12:
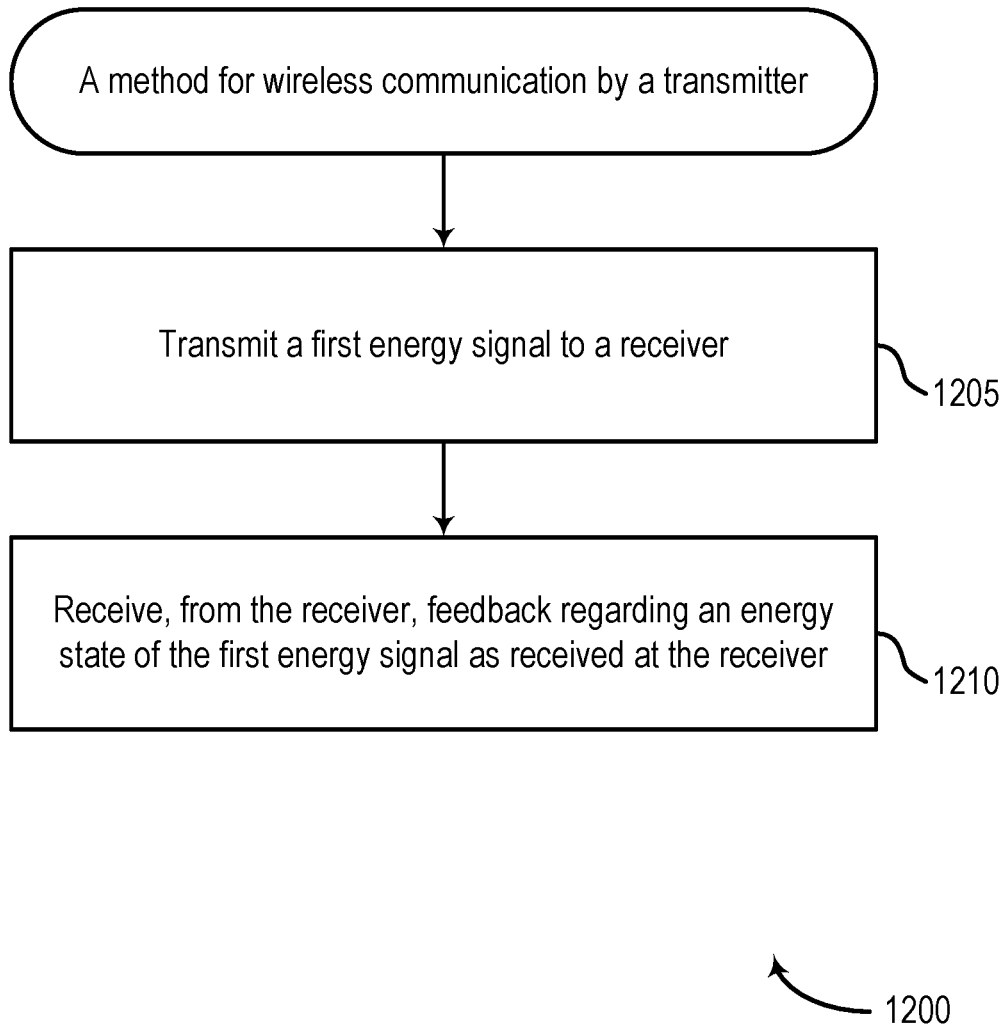
FIG. 12 depicts a method for wireless communications.

FIG. 12 shows an example of a method 1200 for wireless communication by a transmitter. In some aspects, the transmitter is a UE, such as a UE 104 of FIGS. 1 and 3. In some aspects, the transmitter is a network entity, such as a BS 102 of FIGS. 1 and 3, or a disaggregated base station as discussed with respect to FIG. 2.

Method 1200 begins at step 1205 with transmitting a first energy signal to a receiver. In some cases, the operations of this step refer to, or may be performed by, circuitry for transmitting and/or code for transmitting as described with reference to FIG. 14.

Method 1200 then proceeds to step 1210 with receiving, from the receiver, feedback regarding an energy state of the first energy signal as received at the receiver. In some cases, the operations of this step refer to, or may be performed by, circuitry for receiving and/or code for receiving as described with reference to FIG. 14.

In some aspects, the method 1200 further includes determining one or more transmission characteristics based on the feedback. In some cases, the operations of this step refer to, or may be performed by, circuitry for determining and/or code for determining as described with reference to FIG. 14.

In some aspects, the method 1200 further includes transmitting a second energy signal to the receiver in accordance with the one or more transmission characteristics. In some cases, the operations of this step refer to, or may be performed by, circuitry for transmitting and/or code for transmitting as described with reference to FIG. 14.

In some aspects, the one more transmission characteristics comprise at least one of a transmission power, transmission direction, or transmission duration.

In some aspects, the method 1200 further includes conveying information to the receiver via the first energy signal. In some cases, the operations of this step refer to, or may be performed by, circuitry for conveying and/or code for conveying as described with reference to FIG. 14.

In some aspects, the information comprises at least one of: an ID of the receiver; or at least one energy threshold level that determines when the receiver is to transmit feedback.

In some aspects, the at least one energy threshold level is conveyed as a percentage of receiver energy storage or a quantity of energy.

In some aspects, the method 1200 further includes selecting the at least one energy threshold level based on an estimated energy requirement of a subsequent communication with the receiver. In some cases, the operations of this step refer to, or may be performed by, circuitry for selecting and/or code for selecting as described with reference to FIG. 14.

In some aspects, the at least one energy threshold level comprises: a first threshold level below which the receiver is to transmit feedback; and a second threshold level above which the receiver is to transmit feedback.

In some aspects, the method 1200 further includes transmitting a second energy signal to the receiver, wherein the first energy signal and second energy signal are transmitted in different directions from the transmitter. In some cases, the operations of this step refer to, or may be performed by, circuitry for transmitting and/or code for transmitting as described with reference to FIG. 14.

In some aspects, the method 1200 further includes receiving, from the receiver, feedback regarding an energy state of the second energy signal as received at the receiver. In some cases, the operations of this step refer to, or may be performed by, circuitry for receiving and/or code for receiving as described with reference to FIG. 14.

In some aspects, the first energy signal is transmitted with a carrier signal with a first carrier phase; and the second energy signal is transmitted with the carrier signal with a second carrier phase.

In some aspects, the first energy signal is transmitted with a first carrier signal having a first carrier frequency; and the second energy signal is transmitted with a second carrier signal having a second carrier frequency.

Figure 14:
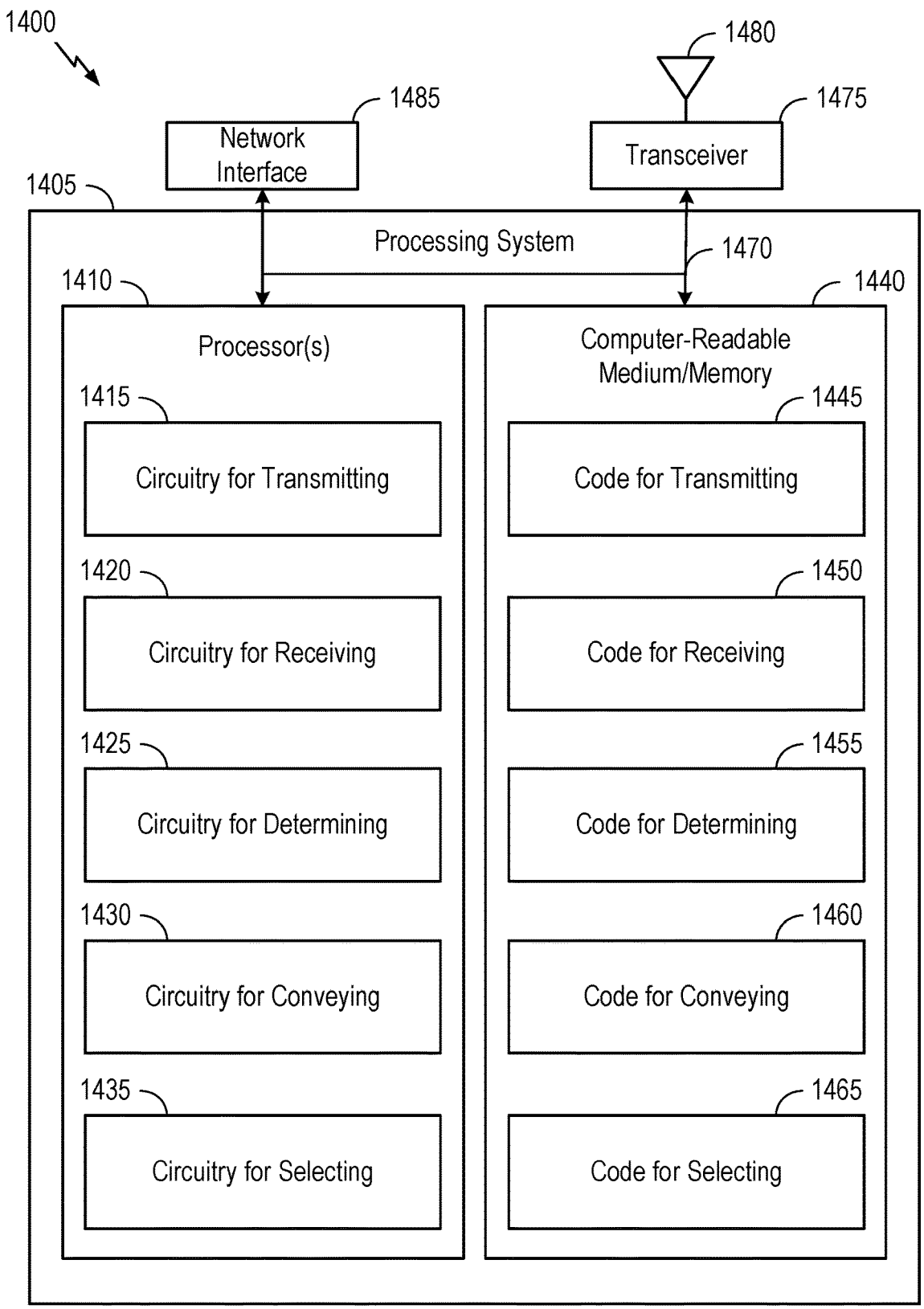
FIG. 14 depicts aspects of an example communications device.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Example Operations of a Receiver

Figure 13:
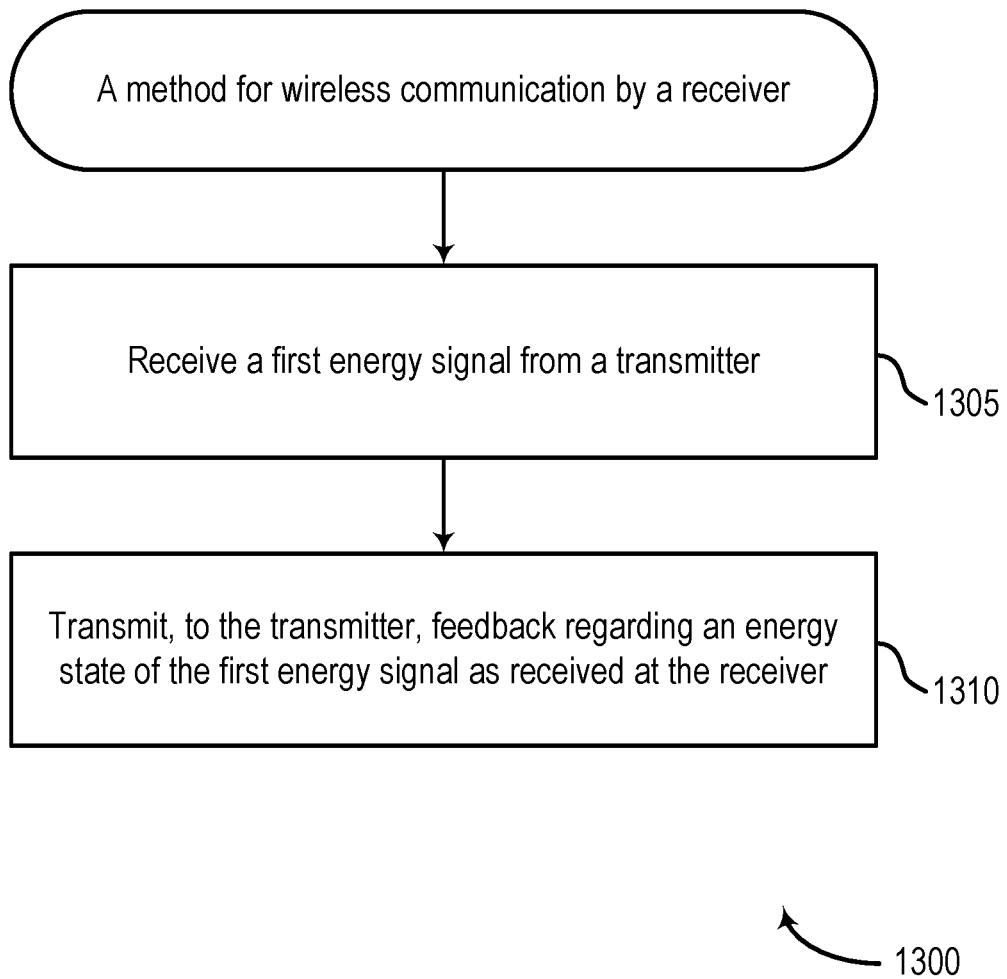
FIG. 13 depicts a method for wireless communications.

FIG. 13 shows an example of a method 1300 for wireless communication by a receiver. In some aspects, the receiver is a UE, such as a UE 104 of FIGS. 1 and 3. In some aspects, the receiver is a network entity, such as a BS 102 of FIGS. 1 and 3, or a disaggregated base station as discussed with respect to FIG. 2.

Method 1300 begins at step 1305 with receiving a first energy signal from a transmitter. In some cases, the operations of this step refer to, or may be performed by, circuitry for receiving and/or code for receiving as described with reference to FIG. 15.

Method 1300 then proceeds to step 1310 with transmitting, to the transmitter, feedback regarding an energy state of the first energy signal as received at the receiver. In some cases, the operations of this step refer to, or may be performed by, circuitry for transmitting and/or code for transmitting as described with reference to FIG. 15.

In some aspects, the method 1300 further includes receiving a second energy signal from the transmitter after transmitting the feedback. In some cases, the operations of this step refer to, or may be performed by, circuitry for receiving and/or code for receiving as described with reference to FIG. 15.

In some aspects, the method 1300 further includes decoding the first energy signal to obtain information. In some cases, the operations of this step refer to, or may be performed by, circuitry for decoding and/or code for decoding as described with reference to FIG. 15.

In some aspects, the information comprises at least one of: an ID of the receiver; or at least one energy threshold level that determines when the receiver is to transmit feedback.

In some aspects, the at least one energy threshold level is indicated as a percentage of receiver energy storage or a quantity of energy.

In some aspects, the receiver is configured to transmit the feedback if the first energy signal is received at an energy level below the at least one energy threshold level.

In some aspects, the receiver is configured to transmit the feedback if the first energy signal is received at an energy level above the at least one energy threshold level.

In some aspects, the at least one energy threshold level comprises a first threshold level and a second threshold level; and the receiver is configured to transmit the feedback if the first energy signal is received at an energy level below the first threshold level or above the second threshold level.

In some aspects, the feedback is transmitted via a backscattered or BLE waveform.

In some aspects, the method 1300 further includes determining time and frequency resources for transmitting the feedback. In some cases, the operations of this step refer to, or may be performed by, circuitry for determining and/or code for determining as described with reference to FIG. 15.

In some aspects, the time and frequency resources are determined based on time and frequency resource allocation shared by a plurality of receivers.

In some aspects, the frequency resources are determined based on frequency hopping.

In some aspects, the frequency hopping is based on a frequency-hopping pattern assigned to the receiver.

In some aspects, the time and frequency resources are determined based on at least one of a time resource, frequency resource, or code resource assigned to the receiver.

Figure 15:
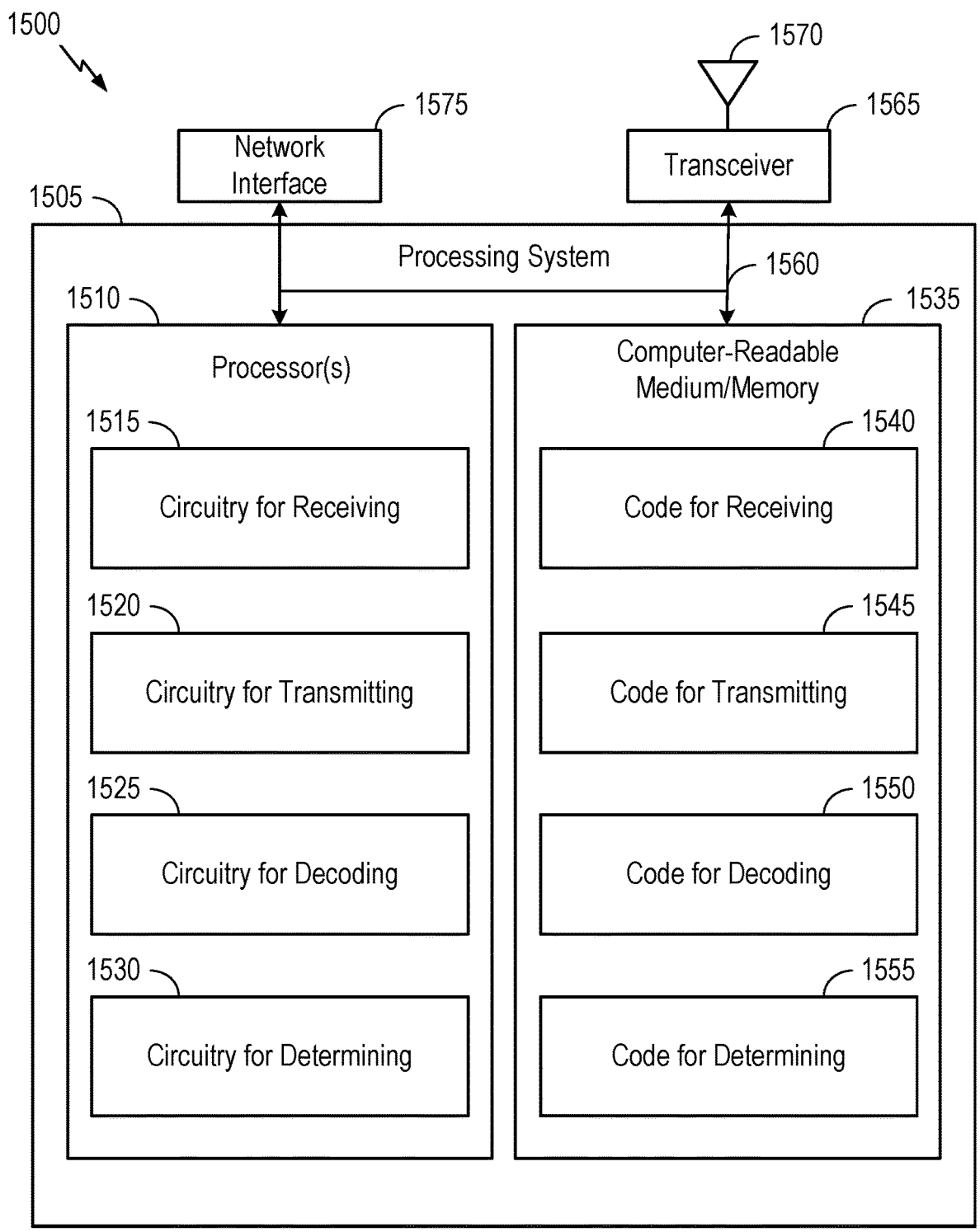
FIG. 15 depicts aspects of an example communications device.

In one aspect, method 1300, or any aspect related to it, may be performed by an apparatus, such as communications device 1500 of FIG. 15, which includes various components operable, configured, or adapted to perform the method 1300.

Communications device 1500 is described below in further detail.

Note that FIG. 13 is just one example of a method, and other methods including fewer, additional, or alternative steps are possible consistent with this disclosure.

Example Communications Devices

FIG. 14 depicts aspects of an example communications device 1400. In some aspects, communications device 1400 is a user equipment, such as UE 104 described above with respect to FIGS. 1 and 3. In some aspects, communications device 1400 is a network entity, such as BS 102 of FIGS. 1 and 3, or a disaggregated base station as discussed with respect to FIG. 2.

The communications device 1400 includes a processing system 1405 coupled to the transceiver 1475 (e.g., a transmitter and/or a receiver). In some aspects (e.g., when communications device 1400 is a network entity), processing system 1405 may be coupled to a network interface 1485 that is configured to obtain and send signals for the communications device 1400 via communication link(s), such as a backhaul link, midhaul link, and/or fronthaul link as described herein, such as with respect to FIG. 2. The transceiver 1475 is configured to transmit and receive signals for the communications device 1400 via the antenna 1480, such as the various signals as described herein. The processing system 1405 may be configured to perform processing functions for the communications device 1400, including processing signals received and/or to be transmitted by the communications device 1400.

The processing system 1405 includes one or more processors 1410. In various aspects, the one or more processors 1410 may be representative of one or more of receive processor 358, transmit processor 364, TX MIMO processor 366, and/or controller/processor 380, as described with respect to FIG. 3. In various aspects, one or more processors 1410 may be representative of one or more of receive processor 338, transmit processor 320, TX MIMO processor 330, and/or controller/processor 340, as described with respect to FIG. 3. The one or more processors 1410 are coupled to a computer-readable medium/memory 1440 via a bus 1470. In certain aspects, the computer-readable medium/memory 1440 is configured to store instructions (e.g., computer-executable code) that when executed by the one or more processors 1410, cause the one or more processors 1410 to perform the method 1200 described with respect to FIG. 12, or any aspect related to it. Note that reference to a processor performing a function of communications device 1400 may include one or more processors 1410 performing that function of communications device 1400.

In the depicted example, computer-readable medium/memory 1440 stores code (e.g., executable instructions), such as code for transmitting 1445, code for receiving 1450, code for determining 1455, code for conveying 1460, and code for selecting 1465. Processing of the code for transmitting 1445, code for receiving 1450, code for determining 1455, code for conveying 1460, and code for selecting 1465 may cause the communications device 1400 to perform the method 1200 described with respect to FIG. 12, or any aspect related to it.

The one or more processors 1410 include circuitry configured to implement (e.g., execute) the code stored in the computer-readable medium/memory 1440, including circuitry such as circuitry for transmitting 1415, circuitry for receiving 1420, circuitry for determining 1425, circuitry for conveying 1430, and circuitry for selecting 1435. Processing with circuitry for transmitting 1415, circuitry for receiving 1420, circuitry for determining 1425, circuitry for conveying 1430, and circuitry for selecting 1435 may cause the communications device 1400 to perform the method 1200 described with respect to FIG. 12, or any aspect related to it.

Various components of the communications device 1400 may provide means for performing the method 1200 described with respect to FIG. 12, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1475 and the antenna 1480 of the communications device 1400 in FIG. 14. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1475 and the antenna 1480 of the communications device 1400 in FIG. 14.

FIG. 15 depicts aspects of an example communications device 1500. In some aspects, communications device 1500 is a user equipment, such as UE 104 described above with respect to FIGS. 1 and 3. In some aspects, communications device 1500 is a network entity, such as BS 102 of FIGS. 1 and 3, or a disaggregated base station as discussed with respect to FIG. 2.

The communications device 1500 includes a processing system 1505 coupled to the transceiver 1565 (e.g., a transmitter and/or a receiver). In some aspects (e.g., when communications device 1500 is a network entity), processing system 1505 may be coupled to a network interface 1575 that is configured to obtain and send signals for the communications device 1500 via communication link(s), such as a backhaul link, midhaul link, and/or fronthaul link as described herein, such as with respect to FIG. 2. The transceiver 1565 is configured to transmit and receive signals for the communications device 1500 via the antenna 1570, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. In various aspects, one or more processors 1510 may be representative of one or more of receive processor 338, transmit processor 320, TX MIMO processor 330, and/or controller/processor 340, as described with respect to FIG. 3. The one or more processors 1510 are coupled to a computer-readable medium/memory 1535 via a bus 1560. In certain aspects, the computer-readable medium/memory 1535 is configured to store instructions (e.g., computer-executable code) that when executed by the one or more processors 1510, cause the one or more processors 1510 to perform the method 12200 described with respect to FIG. 13, or any aspect related to it. Note that reference to a processor performing a function of communications device 1500 may include one or more processors 1510 performing that function of communications device 1500.

In the depicted example, computer-readable medium/memory 1535 stores code (e.g., executable instructions), such as code for receiving 1540, code for transmitting 1545, code for decoding 1550, and code for determining 1555. Processing of the code for receiving 1540, code for transmitting 1545, code for decoding 1550, and code for determining 1555 may cause the communications device 1500 to perform the method 1300 described with respect to FIG. 13, or any aspect related to it.

The one or more processors 1510 include circuitry configured to implement (e.g., execute) the code stored in the computer-readable medium/memory 1535, including circuitry such as circuitry for receiving 1515, circuitry for transmitting 1520, circuitry for decoding 1525, and circuitry for determining 1530. Processing with circuitry for receiving 1515, circuitry for transmitting 1520, circuitry for decoding 1525, and circuitry for determining 1530 may cause the communications device 1500 to perform the method 1300 described with respect to FIG. 13, or any aspect related to it.

Various components of the communications device 1500 may provide means for performing the method 1300 described with respect to FIG. 13, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1565 and the antenna 1570 of the communications device 1500 in FIG. 15. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1565 and the antenna 1570 of the communications device 1500 in FIG. 15.

Example Clauses

Implementation examples are described in the following numbered clauses:

Clause 1: A method for wireless communication by a transmitter, comprising: transmitting a first energy signal to a receiver; and receiving, from the receiver, feedback regarding an energy state of the first energy signal as received at the receiver.

Clause 2: The method of Clause 1, further comprising: determining one or more transmission characteristics based on the feedback; and transmitting a second energy signal to the receiver in accordance with the one or more transmission characteristics.

Clause 3: The method of Clause 2, wherein the one more transmission characteristics comprise at least one of a transmission power, transmission direction, or transmission duration.

Clause 4: The method of any one of Clauses 1-3, further comprising: conveying information to the receiver via the first energy signal.

Clause 5: The method of Clause 4, wherein the information comprises at least one of: an ID of the receiver; or at least one energy threshold level that determines when the receiver is to transmit feedback.

Clause 6: The method of Clause 5, wherein the at least one energy threshold level is conveyed as a percentage of receiver energy storage or a quantity of energy.

Clause 7: The method of Clause 5, further comprising: selecting the at least one energy threshold level based on an estimated energy requirement of a subsequent communication with the receiver.

Clause 8: The method of Clause 5, wherein the at least one energy threshold level comprises: a first threshold level below which the receiver is to transmit feedback; and a second threshold level above which the receiver is to transmit feedback.

Clause 9: The method of any one of Clauses 1-8, further comprising: transmitting a second energy signal to the receiver, wherein the first energy signal and second energy signal are transmitted in different directions from the transmitter.

Clause 10: The method of Clause 9, further comprising: receiving, from the receiver, feedback regarding an energy state of the second energy signal as received at the receiver.

Clause 11: The method of Clause 9, wherein: the first energy signal is transmitted with a carrier signal with a first carrier phase; and the second energy signal is transmitted with the carrier signal with a second carrier phase.

Clause 12: The method of Clause 9, wherein: the first energy signal is transmitted with a first carrier signal having a first carrier frequency; and the second energy signal is transmitted with a second carrier signal having a second carrier frequency.

Clause 13: A method for wireless communication by a receiver, comprising: receiving a first energy signal from a transmitter; and transmitting, to the transmitter, feedback regarding an energy state of the first energy signal as received at the receiver.

Clause 14: The method of Clause 13, further comprising: receiving a second energy signal from the transmitter after transmitting the feedback.

Clause 15: The method of any one of Clauses 13 and 14, further comprising: decoding the first energy signal to obtain information.

Clause 16: The method of Clause 15, wherein the information comprises at least one of: an ID of the receiver; or at least one energy threshold level that determines when the receiver is to transmit feedback.

Clause 17: The method of Clause 16, wherein the at least one energy threshold level is indicated as a percentage of receiver energy storage or a quantity of energy.

Clause 18: The method of Clause 17, wherein the receiver is configured to transmit the feedback if the first energy signal is received at an energy level below the at least one energy threshold level.

Clause 19: The method of Clause 17, wherein the receiver is configured to transmit the feedback if the first energy signal is received at an energy level above the at least one energy threshold level.

Clause 20: The method of Clause 17, wherein: the at least one energy threshold level comprises a first threshold level and a second threshold level; and the receiver is configured to transmit the feedback if the first energy signal is received at an energy level below the first threshold level or above the second threshold level.

Clause 21: The method of any one of Clauses 13-20, wherein the feedback is transmitted via a backscattered or BLE waveform.

Clause 22: The method of any one of Clauses 13-21, further comprising: determining time and frequency resources for transmitting the feedback.

Clause 23: The method of Clause 22, wherein the time and frequency resources are determined based on time and frequency resource allocation shared by a plurality of receivers.

Clause 24: The method of Clause 22, wherein the frequency resources are determined based on frequency hopping.

Clause 25: The method of Clause 24, wherein the frequency hopping is based on a frequency-hopping pattern assigned to the receiver.

Clause 26: The method of Clause 22, wherein the time and frequency resources are determined based on at least one of a time resource, frequency resource, or code resource assigned to the receiver.

Clause 27: An apparatus, comprising: a memory comprising executable instructions; and a processor configured to execute the executable instructions and cause the apparatus to perform a method in accordance with any one of Clauses 1-26.

Clause 28: An apparatus, comprising means for performing a method in accordance with any one of Clauses 1-26.

Clause 29: A non-transitory computer-readable medium comprising executable instructions that, when executed by a processor of an apparatus, cause the apparatus to perform a method in accordance with any one of Clauses 1-26.

Clause 30: A computer program product embodied on a computer-readable storage medium comprising code for performing a method in accordance with any one of Clauses 1-26.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a transmitter, comprising:
    transmitting a first energy signal to a receiver, wherein information is conveyed to the receiver via the first energy signal, and wherein the information comprises at least one of an identification (ID) of the receiver or at least one energy threshold level that determines when the receiver is to transmit feedback; and
    receiving, from the receiver, feedback regarding an energy state of the first energy signal as received at the receiver.

2. The method of claim 1, further comprising
    determining one or more transmission characteristics based on the feedback; and
    transmitting a second energy signal to the receiver in accordance with the one or more transmission characteristics,
    wherein the one more transmission characteristics comprise at least one of a transmission power, transmission direction, or transmission duration.

3. The method of claim 1, wherein the information comprises the at least one energy threshold level that determines when the receiver is to transmit feedback, and wherein the at least one energy threshold level is conveyed as a percentage of receiver energy storage or a quantity of energy.

4. The method of claim 1, wherein the information comprises the at least one energy threshold level that determines when the receiver is to transmit feedback, the method further comprising selecting the at least one energy threshold level based on an estimated energy requirement of a subsequent communication with the receiver.

5. The method of claim 1, wherein the information comprises the at least one energy threshold level that determines when the receiver is to transmit feedback, and wherein the at least one energy threshold level comprises:
    a first threshold level below which the receiver is to transmit feedback; and
    a second threshold level above which the receiver is to transmit feedback.

6. The method of claim 1, further comprising:
    transmitting a second energy signal to the receiver, wherein the first energy signal and second energy signal are transmitted in different directions from the transmitter, wherein the method comprises:
    receiving, from the receiver, feedback regarding an energy state of the second energy signal as received at the receiver; or
    transmitting the first energy signal with a carrier signal with a first carrier phase, and transmitting the second energy signal with the carrier signal with a second carrier phase; or
    transmitting the first energy signal with a first carrier signal having a first carrier frequency, and transmitting the second energy signal with a second carrier signal having a second carrier frequency.

7. A method for wireless communication by a receiver, comprising:
    receiving a first energy signal from a transmitter;
    decoding the first energy signal to obtain information, wherein the information comprises at least one of an identification (ID) of the receiver or at least one energy threshold level that determines when the receiver is to transmit feedback; and
    transmitting, to the transmitter, feedback regarding an energy state of the first energy signal as received at the receiver.

8. The method of claim 7, further comprising:
    receiving a second energy signal from the transmitter after transmitting the feedback.

9. The method of claim 7, wherein the information comprises the at least one energy threshold level that determines when the receiver is to transmit feedback, and wherein the at least one energy threshold level is indicated as a percentage of receiver energy storage or a quantity of energy.

10. The method of claim 9, wherein the information comprises the at least one energy threshold level that determines when the receiver is to transmit feedback, and wherein transmitting the feedback comprises transmitting the feedback if the first energy signal is received at an energy level below the at least one energy threshold level.

11. The method of claim 9, wherein the information comprises the at least one energy threshold level that determines when the receiver is to transmit feedback, and wherein transmitting the feedback comprises transmitting the feedback if the first energy signal is received at an energy level above the at least one energy threshold level.

12. The method of claim 9, wherein the information comprises the at least one energy threshold level that determines when the receiver is to transmit feedback, and wherein:
the at least one energy threshold level comprises a first threshold level and a second threshold level; and
transmitting the feedback comprises transmitting the feedback if the first energy signal is received at an energy level below the first threshold level or above the second threshold level.

13. The method of claim 7, wherein transmitting the feedback comprises transmitting the feedback via a backscattered or Bluetooth low energy (BLE) waveform.

14. The method of claim 7, further comprising determining time and frequency resources for transmitting the feedback, wherein:
determining the time and frequency resources comprises determining the time and frequency resources based on time and frequency resource allocation shared by a plurality of receivers; or
determining the frequency resources comprises determining the frequency resources based on frequency hopping, wherein the frequency hopping is based on a frequency-hopping pattern assigned to the receiver; or
determining the time and frequency resources comprises determining the time and frequency resources based on at least one of a time resource, frequency resource, or code resource assigned to the receiver.

15. A transmitter configured for wireless communication, comprising: a memory comprising processor-executable instructions; and one or more processors configured to execute the processor-executable instructions and cause the transmitter to:
transmit a first energy signal to a receiver, wherein information is conveyed to the receiver via the first energy signal, and wherein the information comprises at least one of an identification (ID) of the receiver or at least one energy threshold level that is configured to determine when the receiver is to transmit feedback; and
receive, from the receiver, feedback regarding an energy state of the first energy signal as received at the receiver.

16. The transmitter of claim 15, wherein the one or more processors are configured to execute the processor-executable instructions and cause the transmitter to:
determine one or more transmission characteristics based on the feedback; and
transmit a second energy signal to the receiver in accordance with the one or more transmission characteristics,
wherein the one more transmission characteristics comprise at least one of a transmission power, transmission direction, or transmission duration.

17. The transmitter of claim 15, wherein the information comprises the at least one energy threshold level that is configured to determine when the receiver is to transmit feedback, and wherein the at least one energy threshold level is conveyed as a percentage of receiver energy storage or a quantity of energy.

18. The transmitter of claim 15, wherein the information comprises the at least one energy threshold level that is configured to determine when the receiver is to transmit feedback, wherein the one or more processors are configured to execute the processor-executable instructions and cause the transmitter to select the at least one energy threshold level based on an estimated energy requirement of a subsequent communication with the receiver.

19. The transmitter of claim 15, wherein the information comprises the at least one energy threshold level that is configured to determine when the receiver is to transmit feedback, and wherein the at least one energy threshold level comprises:
a first threshold level below which the receiver is to transmit feedback; and
a second threshold level above which the receiver is to transmit feedback.

20. The transmitter of claim 15, wherein the one or more processors are configured to execute the processor-executable instructions and cause the transmitter to:
transmit a second energy signal to the receiver, wherein the one or more processors are configured to execute the processor-executable instructions and cause the transmitter to transmit the first energy signal and second energy signal in different directions from the transmitter, wherein the one or more processors are configured to execute the processor-executable instructions and cause the transmitter to:
receive, from the receiver, feedback regarding an energy state of the second energy signal as received at the receiver; or
transmit the first energy signal with a carrier signal with a first carrier phase, and transmit the second energy signal with the carrier signal with a second carrier phase; or
transmit the first energy signal with a first carrier signal having a first carrier frequency, and transmit the second energy signal with a second carrier signal having a second carrier frequency.

21. A receiver configured for wireless communication, comprising: a memory comprising processor-executable instructions; and one or more processors configured to execute the processor-executable instructions and cause the receiver to:
receive a first energy signal from a transmitter;
decode the first energy signal to obtain information, wherein the information comprises at least one of an identification (ID) of the receiver or at least one energy threshold level that is configured to determine when the receiver is to transmit feedback; and
transmit, to the transmitter, feedback regarding an energy state of the first energy signal as received at the receiver.

22. The receiver of claim 21, wherein the one or more processors are configured to execute the processor-executable instructions and cause the transmitter to:
receive a second energy signal from the transmitter after transmitting the feedback.

23. The receiver of claim 21, wherein the information comprises the at least one energy threshold level that is configured to determine when the receiver is to transmit feedback, and wherein the at least one energy threshold level is indicated as a percentage of receiver energy storage or a quantity of energy.

24. The receiver of claim 23, wherein the information comprises the at least one energy threshold level that is configured to determine when the receiver is to transmit feedback, and wherein the one or more processors are configured to execute the processor-executable instructions and cause the transmitter to transmit the feedback if the first energy signal is received at an energy level below the at least one energy threshold level.

25. The receiver of claim 23, wherein the information comprises the at least one energy threshold level that is configured to determine when the receiver is to transmit feedback, and wherein the one or more processors are configured to execute the processor-executable instructions and cause the transmitter to transmit the feedback if the first energy signal is received at an energy level above the at least one energy threshold level.

26. The receiver of claim 23, wherein the information comprises the at least one energy threshold level that is configured to determine when the receiver is to transmit feedback, wherein the at least one energy threshold level comprises a first threshold level and a second threshold level, and wherein the one or more processors are configured to execute the processor-executable instructions and cause the transmitter to transmit the feedback if the first energy signal is received at an energy level below the first threshold level or above the second threshold level.

27. The receiver of claim 21, wherein the one or more processors are configured to execute the processor-executable instructions and cause the transmitter to transmit the feedback via a backscattered or Bluetooth low energy (BLE) waveform.

28. The receiver of claim 21, wherein the one or more processors are configured to execute the processor-executable instructions and cause the transmitter to determine time and frequency resources for transmitting the feedback, and wherein the one or more processors are configured to execute the processor-executable instructions and cause the transmitter to:
- determine the time and frequency resources comprises determining the time and frequency resources based on time and frequency resource allocation shared by a plurality of receivers; or
- determine the frequency resources comprises determining the frequency resources based on frequency hopping, wherein the frequency hopping is based on a frequency-hopping pattern assigned to the receiver; or
- determine the time and frequency resources comprises determining the time and frequency resources based on at least one of a time resource, frequency resource, or code resource assigned to the receiver.

* * * * *